US009497843B1

(12) United States Patent
Kaganovich et al.

(10) Patent No.: US 9,497,843 B1
(45) Date of Patent: Nov. 15, 2016

(54) COLLIDING JETS LASER GUIDING STRUCTURE

(71) Applicant: The United States of America, as represented by the Secretary of the Navy, Washington, DC (US)

(72) Inventors: Dmitri Kaganovich, Potomac, MD (US); Michael H. Helle, Arlington, VA (US); John Palastro, College Park, MD (US); Antonio C. Ting, Silver Spring, MD (US); Daniel F. Gordon, Alexandria, VA (US); Yu-hsin Chen, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/152,627

(22) Filed: May 12, 2016

Related U.S. Application Data

(60) Provisional application No. 62/166,197, filed on May 26, 2015, provisional application No. 62/164,627, filed on May 21, 2015.

(51) Int. Cl.
*H05H 1/00* (2006.01)
*H05H 1/24* (2006.01)
*H05H 1/48* (2006.01)

(52) U.S. Cl.
CPC ............. *H05H 1/00* (2013.01); *H05H 1/24* (2013.01); *H05H 1/48* (2013.01)

(58) Field of Classification Search
None
See application file for complete search history.

(56) References Cited

U.S. PATENT DOCUMENTS

| 5,394,411 A * | 2/1995 | Milchberg | ................ H01S 4/00 372/103 |
| 6,924,600 B2 * | 8/2005 | Mochizuki | ............... G21B 1/23 315/111.21 |
| 7,049,736 B2 * | 5/2006 | Suk | ........................ H05H 15/00 313/231.01 |
| 8,705,692 B2 * | 4/2014 | Umstadter | ........... G01V 5/0016 250/310 |

OTHER PUBLICATIONS

Milchberg et al., "Development and applications of a plasma waveguide for intense laser pulses", Physics of Plasmas 3 (1996), pp. 2149-2155 (including a list of 100 articles that cite this article).*
Gill, "Optical guiding of laser beam in nonuniform plasma", Pramana-journal of physics, vol. 55, Nos. 5 & 6, Nov. & Dec. 2000, pp. 835-842.*

(Continued)

*Primary Examiner* — Jack Berman
(74) *Attorney, Agent, or Firm* — US Naval Research Laboratory; Joslyn Barritt (57) ABSTRACT

A plurality of gas jet nozzles having equal angular separation around a central axis eject gas flows towards the central axis. The gas flows collide and form a gas channel from the neutral gas, the gas channel having a gas density depression at the center of the intersecting gas flow, where the gas density depression is surrounded by a higher density gaseous wall along the central axis. Ionization of the gas in the center produces a plasma channel that can guide a laser pulse fired into the gas along the central axis. The geometric arrangement of the gas jets and/or the backing pressure of the gas flows are configured to produce a gas channel having a predetermined density profile such that the ionized gas forms a plasma channel laser guiding structure configured to guide a laser pulse having predetermined spatial parameters.

16 Claims, 7 Drawing Sheets

(56) References Cited

OTHER PUBLICATIONS

Singh et al., "The effect of plasma channel on the self-distortion of laser pulse propagating through the collisional plasma channel", Optik, 125 (2014), pp. 7198-7202.*

C. G. Durlee and H. M. Milchberg, "Light Pipe for High Intensity Laser Pulses," Phys. Rev. Lett. 71, 2409 (1993).

D. Kaganovich, A. Ting, C. I. Moore, A. Zigler, H. R. Burris, Y. Ehrlich, R. Hubbard, and P. Sprangle, "High efficiency guiding of terawatt subpicosecond laser pulses in a capillary discharge plasma channel", Phys. Rev. E, 59, R4769, (1999).

T. R. Clark and H. M. Milchberg, "Time- and Space-Resolved Density Evolution of the Plasma Waveguide," Phys. Rev. Lett. 78, 2373 (1997).

A. Butler, D. J. Spence, and S. M. Hooker, "Guiding of High-Intensity Laser Pulses with a Hydrogen-Filled Capillary Discharge Waveguide," Phys. Rev. Lett. 89, 185003 (2002).

G. M. Mourou, T. Tajima, and S. Bulanov, "Optics in the relativistic regime," Rev. Mod. Phys. 78, 309 (2006).

V. Malka, "Laser plasma accelerators," Phys. Plasmas 19, 055501 (2012).

Y. Ehrlich, A. Zigler, C. Cohen, J. Krall, and P. Sprangle, "Guiding of High Intensity Laser Pulses in Straight and Curved Plasma Channel Experiments," Phys. Rev. Lett. 77, 4186 (1996).

D. Kaganovich, P. Sasorov, Y. Ehrlich, C. Cohen, and A. Zigler, "Investigations of double capillary discharge scheme for production of wave guide in plasma," Appl. Phys. Lett. 71, 2925 (1997).

A. J. Goers, S. J. Yoon, J. A. Elle, G. A. Hine, and H. M. Milchberg, "Laser wakefield acceleration of electrons with Ionization injection in a pure N5+ plasma waveguide," Applied Physics Letters 104, 214105 (2014).

V. Kumarappan, K. Y. Kim, and H. M. Milchberg, Guiding of Intense Laser Pulses in Plasma Waveguides Produced from Efficient, Femtosecond End-Pumped Heating of Clustered Gases, Phys. Rev. Lett. 94, 205004 (2005).

W. P. Leemans, A. J. Gonsalves, H. S. Mao, K. Nakamura, C. Benedetti, C. B. Schroeder, Cs. Toth, J. Daniels, D. E. Mittelberger, S. S. Bulanov, J.-L. Vay, C. G. R. Geddes, and E. Esarey, "Multi-GeV Electron Beams from Capillary-Discharge-Guided Subpetawatt Laser Pulses in the Self-Trapping Regime," Phys. Rev. Lett. 113, 245002 (2014).

I. B. Zeldovich and I. P. Raizer, Physics of Shock Waves and High Temperature Hydrodynamic Phenomena (Dover, New York, 2002) at p. 92.

Wen Yan, Fucheng Liu, Chaofeng Sang, and Dezhen Wang, "Two dimensional numerical study of two counter-propagating helium plasma jets in air at atmospheric pressure," Physics of Plasmas 21, 063505 (2014).

Claire Douat, Gerard Bauville, Michel Fleury, Mounir Laroussi, and Vincent Puech, "Dynamics of colliding microplasma jets," Plasma Sources Sci. Technol. 21, 034010 (2012).

D. Kaganovich, B. Meerson, A. Zigler, C. Cohen, and J. Levin, "On the cooling of the plasma fireball produced by a laser spark in front of liquids and solids," Phys. Plasmas 3, 631, (1996).

J. P. Palastro and T. M. Antonsen, "Interaction of an ultrashort laser pulse and relativistic electron beam in a corrugated plasma channel," Phys. Rev. E 80, 016409 (2009).

D. Kaganovich, D. F. Gordon, M. H. Nelle, and A. Ting, "Shaping gas jet plasma density profile by laser generated shock waves," Journal of Applied Physics 116, 013304 (2014).

Ajoy Ghatak and K. Thyagarajan, An Introduction to Fiber Optics, (Cambridge University Press, 1998), pp. 149-151.

J. Jeong and F. Hussain, "On the identification of a vortex," Journal of Fluid Mechanics 285: 69-94 (1995).

P. Sprangle, J. Krall, and E. Esarey, "Hose-Modulation Instability of Laser Pulses in Plasmas," Phys. Rev. Lett. 73, 3544 (1994).

A. J. Gonsalves, K. Nakamura, C. Lin, J. Osterhoff, S. Shiraishi, C. B. Schroeder, C. G. R. Geddes, Cs. Tóth, E. Esarey, and W. P. Leemans, "Plasma channel diagnostic based on laser centroid oscillations," Physics of Plasmas 17, 056706 (2010).

K. Duraisamy and S. K. Lele, "Evolution of isolated turbulent trailing vortices," Phys. Fluids 20, 035102 (2008).

M. Chen, E. Esarey, C. G. R. Geddes, E. Cormier-Michel, C. B. Schroeder, S. S. Bulanov, C. Benedetti, L. L. Yu, S. Rykovanov, D. L. Bruhwiler, and W. P. Leemans, "Electron injection and emittance control by transverse colliding pulses in a laser-plasma accelerator," Phys. Rev. STAB 17, 051303 (2014).

R. Lehe, A. F. Lifshitz, X. Davoine, C. Thaury, and V. Malka, "Optical Transverse Injection in Laser-Plasma Acceleration," Phys. Rev. Lett. 111, 085005 (2013).

Claire Tendero, Christelle Tixier, Pascal Instant, Jean Desmaison, and Philippe Leprince, "Atmospheric pressure plasmas: A review," Spectrochimica Acta Part B, 61, 2 (2006).

Andreas Schutze, James Y. Jeong, Steven E. Babayan, Jaeyoung Park, Gary S. Selwyn, and Robert F. Hicks, "The Atmospheric-Pressure Plasma Jet: A Review and Comparison to Other Plasma Sources," IEEE Trans. Plasma Sci., 26, 1685 (1998).

C. G. R. Geddes et al., "High-quality electron beams from a laser wakefield accelerator using plasma-channel guiding," Nature 431, 538 (2004).

Ami Glasner, Eli Livne, and Baruch Meerson, "Vorticity Generation in Slow Cooling Flows," Phys. Rev. Lett., vol. 78, No. 11, pp. 2112-2115 (1997).

\* cited by examiner

COLLIDING JETS LASER GUIDING STRUCTURE

CROSS-REFERENCE

This application is a Non-Provisional of and claims the benefit of priority under 35 U.S.C. §119 based on Provisional Application No. 62/164,627 filed on May 21, 2015 and Provisional Application 62/166,197 filed on May 26, 2016. The Provisional Applications and all references cited herein are hereby incorporated by reference into the present disclosure in their entirety.

TECHNICAL FIELD

The present invention relates to plasma waveguides and their formation.

BACKGROUND

In applications requiring high intensity laser-plasma interactions, it is often desirable to maintain high optical intensity over long interaction distances. Conventional optical components such as mirrors and lenses cannot operate at laser intensities above the damage threshold for the materials forming these components. As a result, such optical elements must be placed far from the laser focus, limiting the interaction distance of the focused pulse to the Rayleigh range.

This limitation can be overcome by focusing the laser beam into a plasma channel consisting of a preformed plasma having a minimum density in the center, for example, a plasma having a parabolic radial density profile. The plasma channel acts as a waveguide for the laser pulse combating diffraction and maintaining the pulse intensity over an extended distance. See C. G. Durfee and H. M. Milchberg, "Light Pipe for High Intensity Laser Pulses," Phys. Rev. Lett. 71, 2409 (1993) and D. Kaganovich et al., "High efficiency guiding of terawatt subpicosecond laser pulses in a capillary discharge plasma channel", Phys. Rev. E, 59, R4769, (1999) ("Kaganovich 1999"); see also T. R. Clark and H. M. Milchberg, "Time- and Space-Resolved Density Evolution of the Plasma Waveguide," Phys. Rev. Lett. 78, 2373 (1997); and A. Butler, D. J. Spence, and S. M. Hooker, Guiding of High-Intensity Laser Pulses with a Hydrogen-Filled Capillary Discharge Waveguide," Phys. Rev. Lett. 89, 185003 (2002).

Plasma-channel guiding of ultrashort laser pulses is a key component for laser-based particle acceleration techniques such as laser wakefield acceleration (LWFA). See G. M. Mourou, T. Tajima, and S. Bulanov, "Optics in the relativistic regime," Rev. Mod. Phys. 78, 309 (2006). LWFA can produce high-quality, low-emittance, ultrashort bunches of mono-energetic electrons. See V. Malka, "Laser plasma accelerators," Phys. Plasmas 19, 055501 (2012). However, several significant technical challenges still separate LWFA from conventional radio-frequency (RF) accelerators in particular, maintaining the driving laser pulse intensity over a long (>10 cm) distance in a low (<1019 cm$^{-3}$) plasma density.

Plasma channel guiding of laser pulses has been demonstrated experimentally using channels created by one of two techniques. The such technique uses solid wall structures based on capillary discharges. See A. Butler, D. J. Spence, and S. M. Hooker, "Guiding of High-Intensity Laser Pulses with a Hydrogen-Filled Capillary Discharge Waveguide," Phys. Rev. Lett. 89, 185003 (2002); see also Kaganovich 1999, supra. The second technique uses wall-free channels based on axicon-focused lasers. See Durfee, supra, and Clark, supra. In both cases, the waveguide is initiated by the on-axis heating of a uniform cold plasma column or neutral gas. Hot gas near the axis expands radially, forming a hollow density channel suitable for guiding.

The capillary discharge technique for creation of a plasma guiding channel uses a dielectric tube several hundred microns in diameter. See Y. Ehrlich, A. Zigler, C. Cohen, J. Krall, and P. Sprangle, "Guiding of High Intensity Laser Pulses in Straight and Curved Plasma Channel Experiments," Phys. Rev. Lett. 77, 4186 (1996). The capillary can be back-filled with gas (see Butler, supra) or filled with wall material ablated when a high voltage breakdown launches from a pair of electrodes located at each end. See D. Kaganovich, P. Sasorov, Y. Ehrlich, C. Cohen, and A. Zigler, "Investigations of double capillary discharge scheme for production of wave guide in plasma," Appl. Phys. Lett. 71, 2925 (1997) ("Kaganovich 1997"). This produces collisional heating near the axis while the region near the wall stays relatively cold, setting up conditions for hollow plasma channel formation.

The wall-free techniques employ a high energy, long laser pulse to ionize and heat a plasma column produced from either clustered (see A. J. Goers, S. J. Yoon, J. A. Elle, G. A. Hine, and H. M. Milchberg, "Laser wakefield acceleration of electrons with ionization injection in a pure N5+ plasma waveguide," Applied Physics Letters 104, 214105 (2014)), or un-clustered (see Geddes, supra) gas jets. In order to produce an axially extended channel, the hydrodynamic heater pulse must be line-focused into the gas column by either an axicon (conical lens), see Durfee, supra, or a cylindrical focusing optic, see Geddes, supra.

Creation of long channels requires high laser energy and precise co-linear alignment, making this scheme more difficult to implement than capillary channels. For shorter distances (one centimeter or less), a self-guided laser in clustered gas can be used to initiate a shock wave-based guiding channel. See V. Kumarappan, K. Y. Kim, and H. M. Milchberg, "Guiding of Intense Laser Pulses in Plasma Waveguides Produced from Efficient, Femtosecond End-Pumped Heating of Clustered Gases, Phys. Rev. Lett. 94, 205004 (2005).

The current world record for LWFA electron energy, 4.2 GeV, was demonstrated using a 9-cm long capillary discharged waveguide. See W. P. Leemans, A. J. Gonsalves, H.-S. Mao, K. Nakamura, C. Benedetti, C. B. Schroeder, Cs. Toth, J. Daniels, D. E. Mittelberger, S. S. Bulanov, J.-L. Vay, C. G. R. Geddes, and E. Esarey, "Multi-GeV Electron Beams from Capillary-Discharge-Guided Subpetawatt Laser Pulses in the Self-Trapping Regime," Phys. Rev. Lett. 113, 245002 (2014). While in principle, a discharge capillary could be extended beyond 10 cm, neither effective guiding nor acceleration has been demonstrated at such lengths. It appears that the limitation is discharge formation, but this remains poorly understood due to difficulties in diagnosing the plasma within a capillary. Standard diagnostic techniques, such as optical interferometry, cannot be used to transversely probe the plasma within the capillary. This also makes it difficult to monitor the performance of the waveguide. Additionally, the dielectric wall is subject to damage by the laser field, discharge current, and plasma.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a method for creating a "wall-free" pre-formed gas or plasma waveguide using several colliding gas jets.

The present invention provides a guiding channel for propagation of a laser beam. In accordance with the present invention, a plurality of gas jet nozzles having equal angular separation around a central axis eject gas flows towards the central axis. The gas flows collide and form a gas channel from the neutral gas, the gas channel having a gas density minimum or "depression" at the center of the intersecting gas flow, where the gas density minimum is surrounded by a higher density gaseous wall along the central axis. Ionization of the gas in the center produces a plasma channel that can guide a laser pulse fired into the gas along the central axis. In accordance with the present invention, the geometric arrangement of the gas jets and/or the backing pressure of the gas flows are configured to produce a gas channel having a predetermined density profile such that the ionized gas forms a plasma channel laser guiding structure configured to guide a laser pulse having predetermined spatial parameters.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a new method for producing a wall-less preformed plasma waveguide. In the method for producing a plasma waveguide in accordance with the present invention, colliding gas streams are used to create a hollow gas channel that is then ionized by an ionizing laser pulse or by any other suitable ionization mechanism to form a plasma guiding channel within the gas that can guide a subsequent main propagating laser pulse. In some cases the same pulse can serve as both the ionizing pulse and the main propagating pulse.

Figure 1:
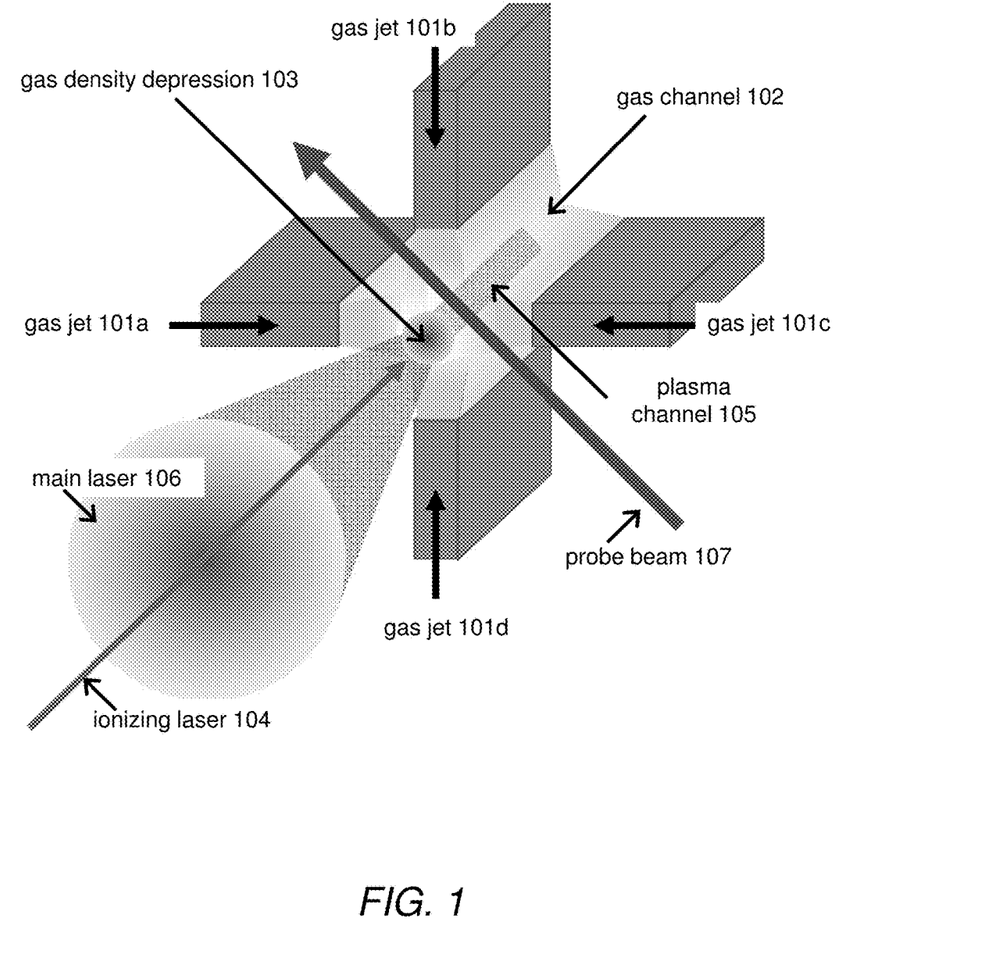
FIG. 1 is a block drawing illustrating aspects of an exemplary embodiment of a method for forming a wall-free plasma waveguide using colliding gas jets in accordance with the present invention.

Aspects of the method for forming a plasma waveguide in accordance with the present invention are illustrated in FIG. 1. In accordance with the present invention, three or more gas jet nozzles having equal angular separation around a central axis, e.g., gas jet nozzles $101a$-$101d$ having a 90° separation from one another, eject gas flows, often referred to herein as "gas jets," towards the central axis. The gas jets are configured to collide with one another so that the colliding jets form symmetrical gas channel 102 from the neutral, i.e., unionized, gas around the central axis. The geometric arrangement of the gas jet nozzles can be configured so that the gas channel will have a predetermined gas density profile that can form a plasma channel suitable for guiding a laser beam having predetermined geometric parameters. Thus, as described below, in some cases the nozzles can be configured to produce a gas channel 102 having a cylindrically symmetric density profile which can enable the formation of a laser guiding channel suitable for the propagation of a laser beam having a Bessel profile, while in other cases the nozzles can be configured to produce a gas channel 102 having a parabolic density profile so as to enable the formation of a laser guiding channel for a Gaussian laser beam. As described below, the density profile of gas channel 102—and thus the spatial profile of the laser guiding channel formed therefrom—can also be tuned by controlling the backing gas pressure of the gas jets.

In an ideal case, all of the gas jets will be synchronized and set to the same gas ejection velocity, though, as described below, in some embodiments, the gas jets can be configured to account for variations in ejection timing and/or gas pressure to produce a laser guiding structure in accordance with the present invention.

The colliding neutral gas flows also create an on-axis gas density minimum, or "gas density depression" 103 within symmetrical gas channel 102, which is sustained for an extended duration within the gas channel. The reason for the formation of this gas density minimum is as follows. At the moment of the collision, the gas is heated at the center by colliding shock waves. See I. B. Zeldovich and I. P. Raizer, *Physics of Shock Waves and High Temperature Hydrodynamic Phenomena* (Dover, N.Y., 2002) at p. 92; see also Wen Yan, Fucheng Liu, Chaofeng Sang, and Dezhen Wang, "Two-dimensional numerical study of two counter-propagating helium plasma jets in air at atmospheric pressure," Physics of Plasmas 21, 063505 (2014); and Claire Douat, Gerard Bauville, Michel Fleury, Mounir Laroussi, and Vincent Puech, "Dynamics of colliding microplasma jets," *Plasma Sources Sci. Technol.* 21, 034010 (2012). After several acoustic times (characteristic distance divided by speed of sound) the pressure in the high temperature region is reduced to the ambient pressure created by the stationary gas jet flows. By this time the shock waves are already absent, and the hot gas at the center develops into a slowly evolving cavity with high temperature and density contrasts between the central and peripheral parts. Evolution of this hot cavity is described by conductive-advective cooling that is characterized by a long lifetime and almost constant dimensions. See D. Kaganovich, B. Meerson, A. Zigler, C. Cohen, and J. Levin, "On the cooling of the plasma fireball produced by a laser spark in front of liquids and solids," *Phys. Plasmas* 3, 631, (1996) ("Kaganovich 1996"). Since the gas can be considered as ideal and pressure p=nT≈const, the gas density n is expected to be at a minimum in the region where the temperature T reaches its highest value.

Once the on-axis gas density depression 103 has formed by the colliding gas flows, in accordance with the present invention, the neutral gas is ionized, e.g., by an ionizing laser pulse or by an electrical discharge, to generate the laser guiding structure. Thus, in the method of the present invention, after formation of the gas density depression, at time t1, a picosecond or nanosecond ionizing laser pulse 104 is then focused at the entrance of the on-axis gas density depression 103. The leading edge of laser pulse 104 ionizes the gas near the entrance to form a plasma channel 105 whose length is much longer than its transverse dimension, i.e., its width, such that plasma channel 105 forms a guiding structure for a second, main laser pulse 106 fired along the central axis at time t2. Probe beam 107 provides real-time feedback about guiding channel parameters such as its diameter, depth, and stability. As noted above and as described in more detail below, the geometric arrangement of the gas jets 101a-101d and/or the backing pressure of the gas jets can be tuned to produce a gas channel 102 having a predetermined density profile such that gas channel 102 forms a laser guiding structure in the form of a plasma channel that can guide a laser pulse having predetermined spatial parameters. The characteristics of the plasma channel 105 can be further adjusted by tuning the parameters of the ionizing pulse.

The density profile $n_e(r)$ of gas channel 102 formed by the collision of the neutral gas jets is $$n_e(r) \approx n_e(0) + \left(\frac{\Delta n_{ch}}{r_{ch}^2}\right) r^2$$

where $\Delta n_{ch}$ and $r_{ch}$ are the depth and width, respectively, of the channel. If the gas jets 101a-101d are identical and are fired simultaneously, the density profile of plasma channel 105 formed in accordance with the present invention will be nearly parabolic, such that it can guide a main laser pulse 106 having a Gaussian laser mode and a radius $$w_0 = \left(\frac{\pi r_e \Delta n_{ch}}{r_{ch}^2}\right)^{-1/4},$$

where $r_e$ is the classical electron radius. See J. P. Palastro and T. M. Antonsen, "Interaction of an ultrashort laser pulse and relativistic electron beam in a corrugated plasma channel," *Phys. Rev. E* 80, 016409 (2009).

As described in more detail below, such a parabolic density profile can also be produced by arranging the gas jets so that they do not collide head-on, but instead are offset from one another. In contrast, the gas density profiles generated by head-on collision of the gas flows are flat in the middle at earlier times in their evolution and become turbulent at later times.

In addition, as described in more detail below, the gas density profile of gas channel 102 is sensitive to the backing pressure and time jitter in the opening of the gas valves, though as noted above the density profile of gas channel 102 can be tuned by adjusting the backing gas pressure or the geometrical configuration (e.g., diameters and separation) of the nozzles. However, turbulence still tends to develop for higher pressures and larger dimensions, where the turbulence breaks the interaction region into several small unstable vortices, each of which is nearly cylindrically symmetric and has close a parabolic density profile.

The timing of the ionization can also affect the spatial profile of the plasma channel 103 and thus the spatial profile of the laser beam that can be guided through the channel. For example, in the case of a plasma channel formed by gas jets having asymmetrical gas pressures described in more detail below with respect to FIGS. 4A and 4B, if ionization occurs at time t1=4.6 μs, plasma channel 103 will have a flat density profile near the center, making it suitable for guiding a laser pulse having a Bessel profile fired at time t2, whereas if ionization occurs at time t1=6 μs, the channel will have a parabolic profile that can guide a Gaussian laser pulse having a spot size $w_0$=23 μm fired at time t2. At later times, turbulence can develop and the channel symmetry can break, while at even later times, strong turbulence can split the interaction region into small vortices destroying the channel. Eventually, the center of the gas density depression cools down and the plasma guiding channel disappears, though as described below, the channel can be destroyed earlier than it naturally would expire by turbulence that develops in and around the interaction region.

As noted above, the spatial characteristics of plasma channel 105 can be further tuned by adjusting the parameters of the ionizing pulse.

In some embodiments, ionizing laser pulse 104 and main laser pulse 106 share the same optical beam path with the same focusing element. Thus, unlike other wall-less techniques mentioned above, the "ionization while guiding" scheme of the present invention eliminates the need of a line focus and simplifies optical alignment.

In other embodiments, an electrode can be added near each end of gas density structure 102 to produce an electrical discharge which ionizes the gas to form laser guiding plasma channel 105, and in such embodiments, pre-ionizing laser pulse 103 can be omitted. Since the gas density is already minimal at the center and no gas needs to be moved for the plasma channel generation, in still other embodiments, bulk ionization of the entire gas volume is possible. This can be done by more exotic techniques such as high pressure RF discharge. When engineered properly, these techniques can ionize gas in very long channels. Finally, gas can be pre-ionized by using plasma torches instead of in the gas jets; in such embodiments, the channel will be created by colliding plasma jets or a plasma vortex.

An apparatus for forming a colliding jet laser guiding structure in accordance with the present invention can use commercial pulsed or continuous flow solenoid gas valves. In some embodiments, slit-shaped gas nozzles can be used to extend the length of the guiding structure so that its length is much longer than its transverse dimensions, with the maximum channel length being limited only by the length of the gas column and the energy of the ionizing pulse. An elongated plasma channel can also be achieved by stacking multiple sets of short guiding units along the laser propagation direction, or by using custom-built long nozzles.

In addition, to avoid density profile tapering near the ends of the channel, two cover plates at the entrance and the exit of the gas channel can be installed. These plates will limit the gas from flowing in the axial direction after collision. A pinhole on each plate can serve as the passage for the laser beam, and can also serve as electrodes for the electrical discharge described above, where applicable. The entire structure can be enclosed into a large volume transparent box with differential pumping to reduce the load on the vacuum system of the laser-plasma accelerator.

Figure 2:
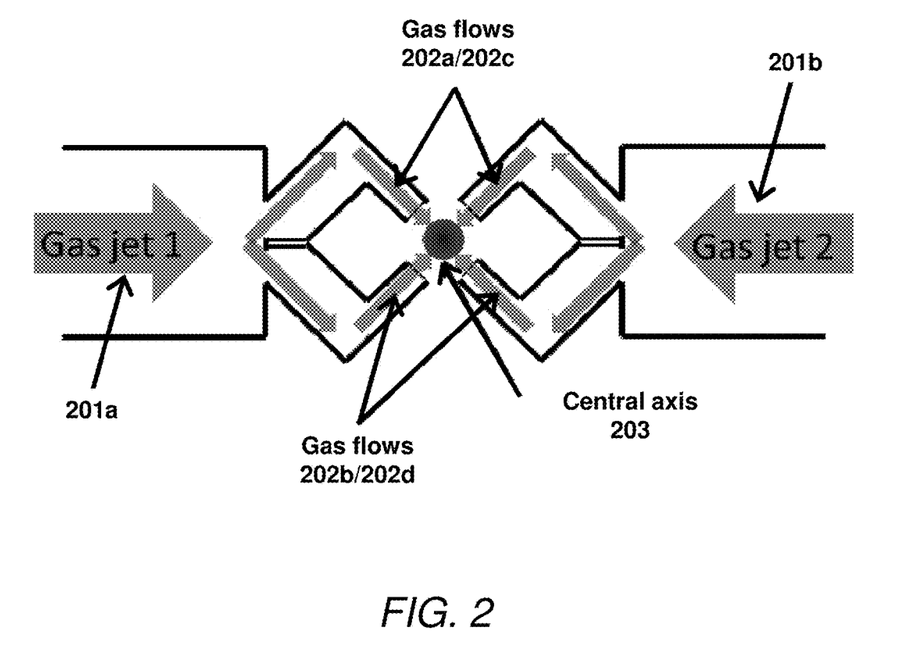
FIG. 2 is a block diagram illustrating an exemplary embodiment of multi-nozzle gas jets that can be used to form a wall-free plasma waveguide in accordance with the present invention.

In some embodiments, more than one nozzle can be incorporated in a single gas jet, with the nozzles being configured so as to produce the symmetric counter-propagating gas flows having equal angular separation around the common axis. An exemplary configuration of such a multi-nozzle embodiment is illustrated in FIG. 2. In the embodiment illustrated in FIG. 2, two opposing gas jets situated 180° apart are used, so that a first gas jet 201a can produce gas flows 202a and 202b and a second gas jet 201b can produce gas flows 202c and 202d, gas flows 202a, 202b, 202c, and 202d, with the gas jets in each nozzle being oriented 90° from the other so that the four gas flows are symmetrically oriented around central axis 203. Such a configuration simplifies the resolution of the time jitter issues described below by reducing the number of gas jets from four to only two, easing overall synchronization control.

Additional aspects of colliding gas jet flows and formation of a laser guiding channels from such colliding gas flows are described below.

In order to examine the evolution of the colliding gas jet flows and laser guiding channels from an apparatus and method in accordance with the present invention, the inventors used a 2-D version of the 3-D SPARC computer simulation software described in detail in D. Kaganovich, D. F. Gordon, M. H. Helle, and A. Ting, "Shaping gas jet plasma density profile by laser generated shock waves," Journal of Applied Physics 116, 013304 (2014) ("Kaganovich 2014"). FIGS. 3A-3C, 4A-4B, 5A-5B, 6A-6B, and 7A-7B illustrate the results from these simulations and illustrate aspects of the ways in which a plasma channel/laser guiding structure can be created by the use of symmetrically oriented counter-propagating gas flows in accordance with the present invention.

Figures 3A, 3B, 3C:
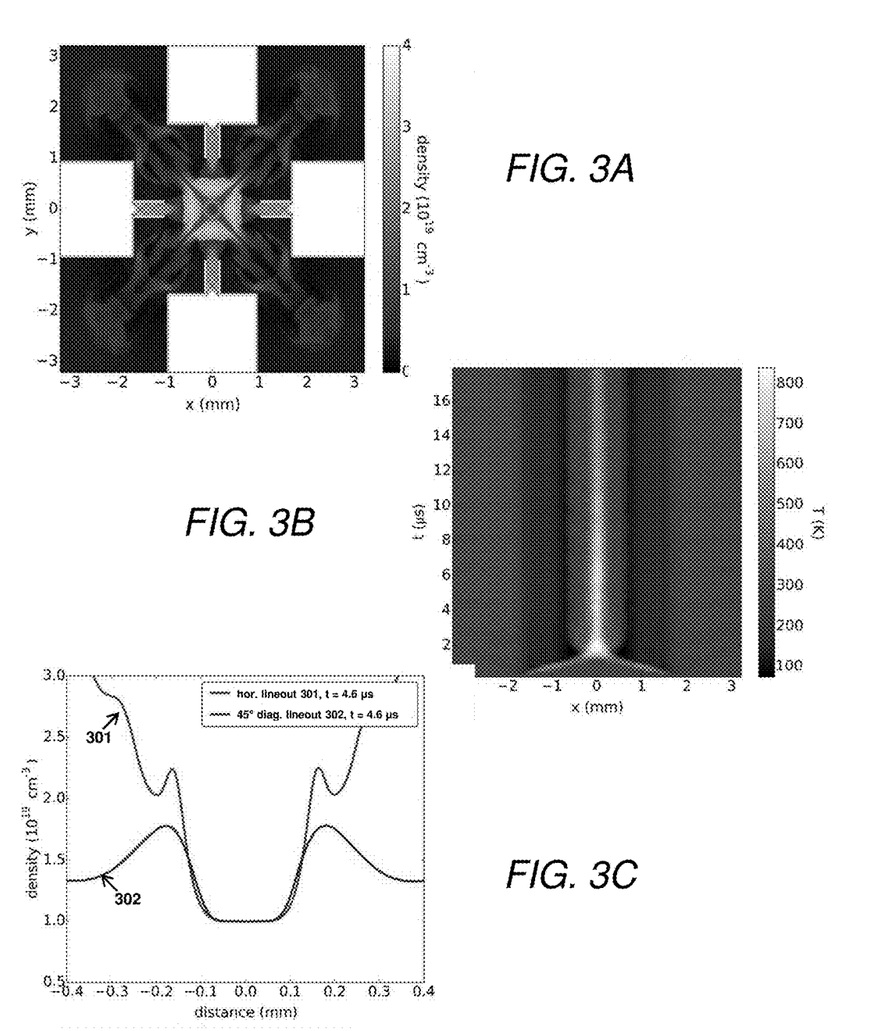
FIGS. 3A-3C are plots illustrating aspects of a wall-free plasma waveguide formed by colliding gas jets in accordance with the present invention.

A screen shot of a SPARC-simulated generic gas jet configuration is illustrated in FIG. 3A. All simulations were conducted for helium gas, motivated by its widespread use in LWFA experiments, with dimensionless specific heat at constant volume cv=3/2, thermometric conductivity K=1.7 cm$^2$/s, and kinematic viscosity v=1.2 cm$^2$/s.

The initial reservoir pressure was set to 2 atmospheres. The nozzles had an internal thickness of 250 orifice orthogonal distance of 1 mm, and length of 0.65 mm. The thickness of all walls was 50 μm. The corresponding Reynolds number for these parameters is estimated to be Re=vL/v≈2500, where v≈3000 m/s is the maximum escape velocity of helium into vacuum, see Zeldovich, supra, and L≈100 μm is the characteristic length for the region of interest.

At time t=0, the reservoirs are uniformly filled with room temperature gas at a backing pressure of 2 atmospheres. The gas then starts to freely expand through the 0.25 mm thick nozzles into vacuum. As can be seen in FIG. 3A, a gas density depression surrounded by higher density gaseous wall forms when the gas flows encounter each other near the center. After about 4 μs, the gas density reaches a minimum around the center of the collision creating a channel in the neutral gas.

When ionized as described above, e.g., by an ionizing laser pulse or electrical discharge fired through the center thereof at time t1, this gas density depression region can serve as a guiding channel, e.g., for a subsequent laser pulse, where the radially-symmetric, parabolic electron plasma distribution permits a laser beam having a Gaussian radial profile to be guided through the channel without its size being changed. See G. M. Mourou, T. Tajima, and S. Bulanov, "Optics in the relativistic regime," Rev. Mod. Phys. 78, 309 (2006). The gas pressure and geometrical parameters of the simulation were chosen to reduce the Reynolds number and to avoid turbulence as long as possible while keeping the channel deep enough for laser guiding.

FIG. 3B shows is a color map of the gas temperature and shows the time evolution of the temperature along a horizontal line that crosses the center of the gas density depression. The temperature in the center remains high for about 2 μs, exceeding 800 K at earlier times, cooling from 800 K as time progresses from t=2 μs to about 300 K at t=16 μs, with the channel diameter narrowing around the center from about 1 mm at t=2 μs to about 0.5 mm at t=16 μs.

The flat-top temperature profile across the gas channel and slow change in the channel diameter as the temperature rises shown in FIG. 3B are typical signatures of conductive-advective cooling. See Kaganovich 1996, supra. During this process, the thermal energy in the middle is transferred to the colder in-flowing gas. This gas inflow from the periphery is necessary to maintain approximately constant pressure across the interaction region. As a result, the size of the hot area remains the same, while high temperature and low density contrasts are preserved between the center and surrounding areas.

The plots in FIG. 3C are the linear representations of the gas density color map shown in FIG. 3A, where plot 301 is a horizontal lineout showing the variation in gas density measured from the center of the gas flows at time t=4.6 μs and plot 302 is a lineout showing the variation in gas density along a 45° line extending through the center of the gas flows at the same time t=4.6 μs.

As can be seen from the plots 301 and 302, these lineouts overlap near the center, showing that the intersecting gases in this exemplary case produce a cylindrical rather than a parabolic gas density profile, with the density profile resembling a stepped-index fiber supporting Bessel function laser propagation modes. See Ajoy Ghatak and K. Thyagarajan, *An Introduction to Fiber Optics*, (Cambridge University Press, 1998), pp. 149-151.

The plots in FIGS. 3A-3C depict an idealized gas flow, where the gas jets were configured symmetrically with equal reservoir backing pressure and synchronized valve release. In a real system, however, deviations, such as unequal backing pressures and time jitters, may be present. To estimate the requirements of a practical device, the inventors of the present invention performed additional simulations with intentional gas jet asymmetries.

The inventors first investigated the formation of the density depression with slightly different reservoir backing pressures. In an exemplary case described herein, the backing pressure in one of the jets was offset by 1% and in another by 2%, such that two of the jets had backing pressures of 2.00 atm, while the other two had backing pressures of 2.02 and 2.04 atm, respectively.

Figure 4A:
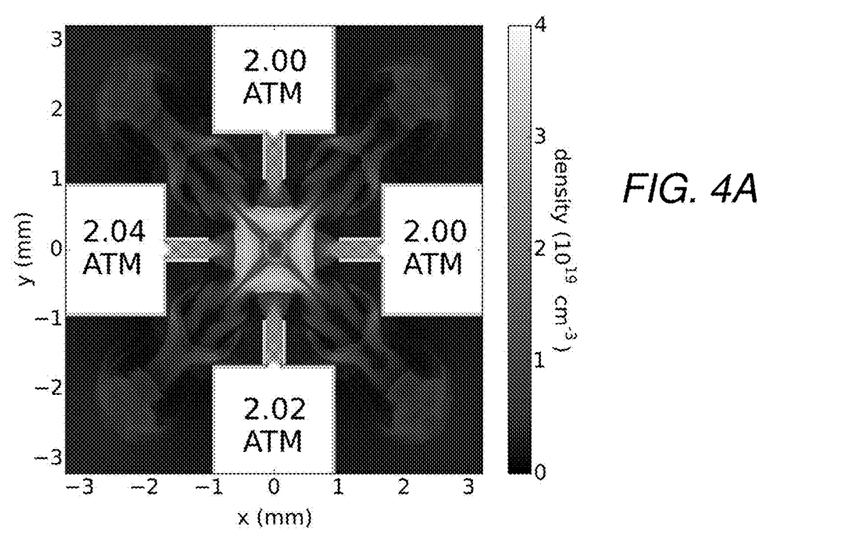
FIGS. 4A and 4B are plots illustrating the effects of differences in gas jet pressure in the formation of a wall-free plasma waveguide by colliding gas jets in accordance with the present invention.
Figure 4B:
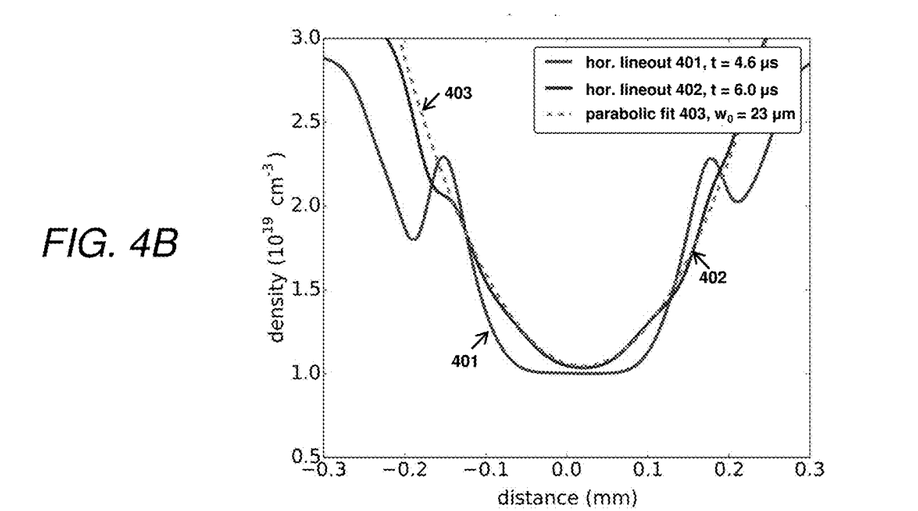

The results are shown in FIGS. 4A and 4B. As can be seen from the screen shot shown in FIG. 4A, a gas density minimum that can be used to form the laser guiding plasma channel is still formed by the collision of the gas flows having unequal pressure, though the location of the minimum is shifted slightly up and to the right as a result of the higher gas pressures in the two gas jets.

As can be seen from the lineout plots in FIG. 4B, while the location of the gas density minimum shifts off-center as described above, the gas density profiles also change with time, and so, by ionizing the gas at different times, channels suitable for different types of laser pulses can be created. Thus, horizontal lineout 401, which shows the gas density profile at time t=4.6 μs, is flat at its center, which, as described above is suitable for the formation of a guiding channel for a laser pulse having a Bessel profile. In contrast, horizontal lineout 402, which shows the gas density profile at t=6.0 μs, has a substantially parabolic density profile (compare to parabolic fit plot 403), making it suitable for the formation of a guiding channel for a Gaussian laser pulse, e.g., a pulse having a radius $w_0$=23 μm as shown in the FIGURE.

However, in both cases, off-center shift of the gas density minimum increases significantly for even-larger pressure differences. In addition, the lifetime of such asymmetric channels is shorter since it is prone to the earlier development of turbulence. See Glasner, supra. Thus, care should be taken to minimize the pressure differences in the gas jets so as to maximize the utility of the guiding channel to be formed therefrom.

Another practical consideration that could affect the guiding structure is time jitter in the gas jet valve openings. In the simulations described above, the gas in all of the gas jets was deemed to be released simultaneously at time t=0 by instantaneously opening the valves. However, real gas jets have opening times ranging from a few microseconds for piezo-driven valves to a few hundred microseconds for solenoid-based ones, and so simultaneous opening is not likely to occur. While slowly opening the jets might relax the requirements for synchronized gas flow, offsetting the opening times too much, either intentionally or inadvertently, can result in the creation of an unstable gas density depression at the vortex of the colliding gas flows.

Figure 5A:
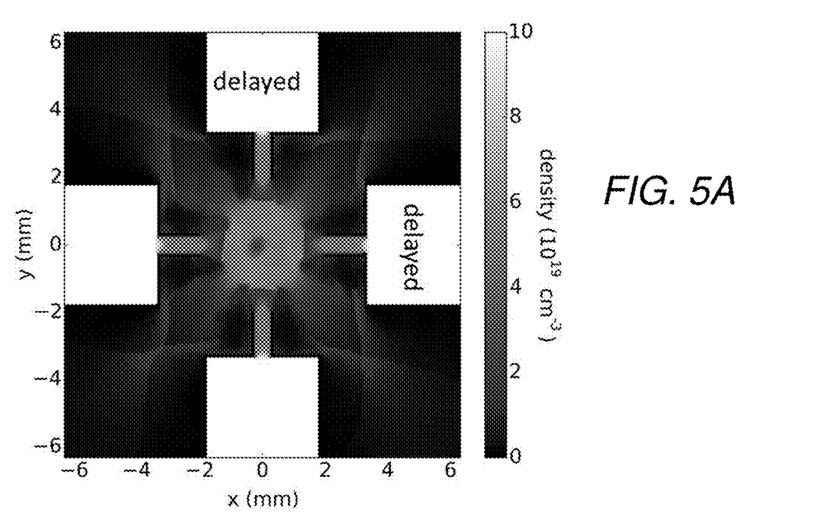
FIGS. 5A and 5B are plots illustrating aspects of gas jet time differentials in the formation of a wall-free plasma waveguide by colliding gas jets in accordance with the present invention.
Figure 5B:
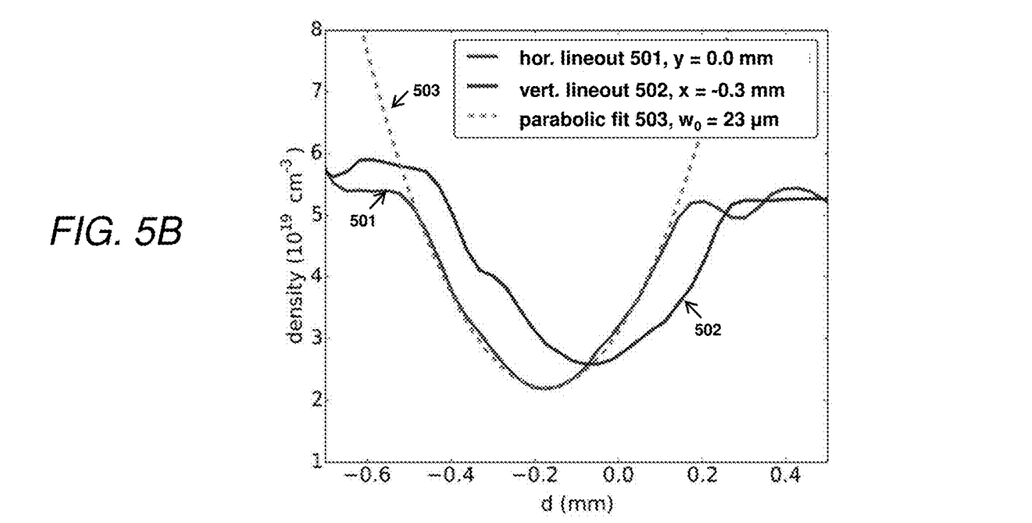

FIGS. 5A and 5B illustrate the effects of such time-offset opening of the gas jets on creation of a plasma guiding channel by the method of the present invention.

In the simulation illustrated by the screen shot shown in FIG. 5A, two of the jets were opened 5 microseconds later than the other two. As can be seen in FIG. 5A, collision of the gas jets still creates a vortex with a minimum density spot traveling around the central axis.

However, as can be seen from the lineout plots shown in FIG. 5B, the gas density minimum measured along a horizontal direction, shown by horizontal lineout 501, is in a different place along the x axis than is the gas density minimum measured along a vertical direction, as shown by vertical lineout 502. While both the horizontal and vertical density profiles are essentially parabolic (see parabolic fit 503), suitable for formation of a guiding channel for a Gaussian laser pulse having a radius $w_0$=25 the location of that channel will constantly change over time, making alignment of the laser pulse into such a "wobbly" channel difficult. Fortunately, gas jets with shorter jitter times (<3 μs) can generate stable channels similar to those generated by symmetrical gas jets, so care should be taken to minimize such time delays.

In some cases, gas channels formed by jets having a longer time jitter can be transformed into more stable guiding structure by introducing a longitudinal gas flow, e.g., by a pump configured to move the gas along the channel and/or by tilting the gas nozzles in the direction of the z-axis (i.e., in a direction perpendicular to the x-y plane of FIG. 5A). When a longitudinal gas flow is introduced, the gas will experience a spiraling motion, creating a more stable and stationary vortex and thus a more stable and stationary gas density minimum. See J. Jeong and F. Hussain, "On the identification of a vortex," *Journal of Fluid Mechanics* 285: 69-94 (1995).

In other embodiments, a more stable and controllable gas vortex can be achieved by arranging the gas jets so that, while still symmetric around the central axis, they are offset one from another.

In an exemplary simulation of this embodiment of an apparatus for forming a laser-guiding plasma channel in accordance with the present invention, each nozzle is shifted laterally by 350 μm so that opposing gas jets do not collide head-on, but instead are directed so that they travel in opposite but parallel directions.

Figure 6A:
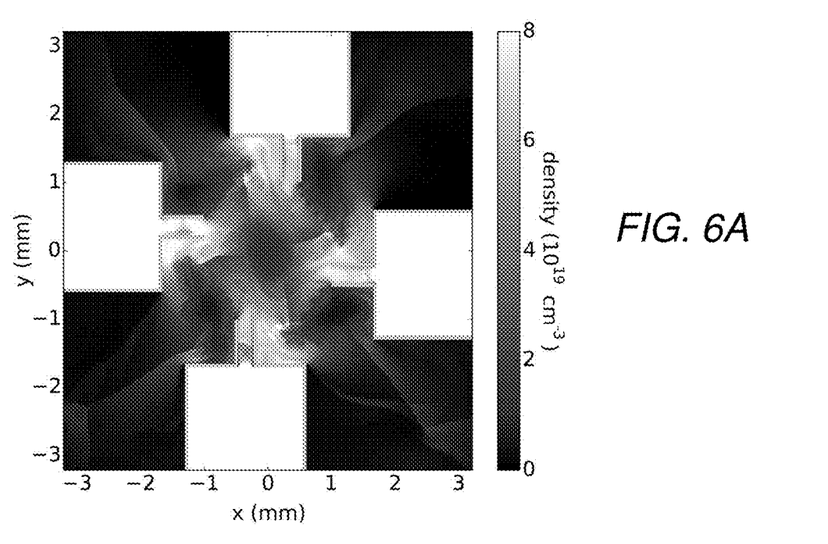
FIGS. 6A and 6B are plots illustrating aspects of a wall-free plasma waveguide formed by offset colliding gas jets in accordance with the present invention.

A screen shot from the SPARC simulation of this embodiment is shown in FIG. 6A and shows the evolution of the vortex gas density profile in such a case. Although small revolutions of the gas density depression around the center still present a potential problem for laser alignment, mode oscillation studies indicate that a small misalignment would still guide the laser pulse through the channel with small centroid oscillations. See P. Sprangle, J. Krall, and E. Esarey, "Hose-Modulation Instability of Laser Pulses in Plasmas," *Phys. Rev. Lett.* 73, 3544 (1994); and A. J. Gonsalves, K. Nakamura, C. Lin, J. Osterhoff, S. Shiraishi, C. B. Schroeder, C. G. R. Geddes, Cs. Tóth, E. Esarey, and W. P. Leemans, "Plasma channel diagnostic based on laser centroid oscillations," *Physics of Plasmas* 17, 056706 (2010). The channel stability can be further improved by adjusting the geometrical configuration of the nozzles, which will be studied in more detail in the future.

Figure 6B:
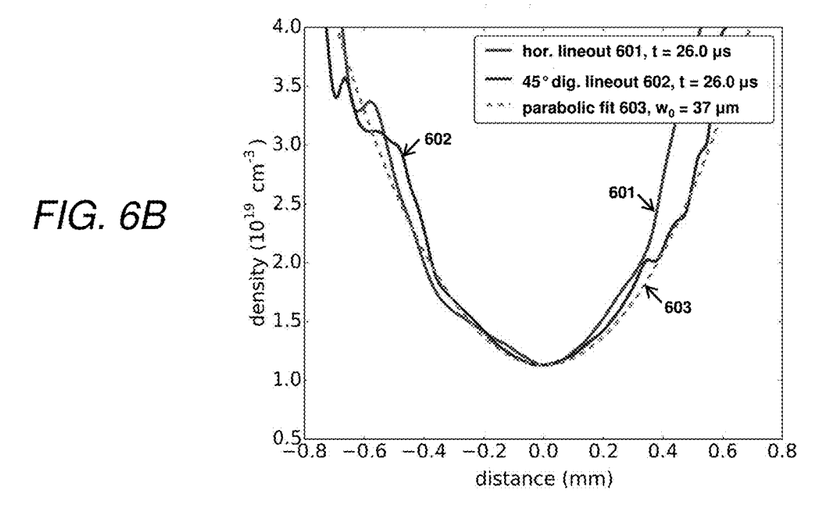

The lineout plots shown in FIG. 6B illustrate the benefits of forming a gas channel using offset gas jets in accordance with this embodiment of the present invention. As can be seen in FIG. 6B, both the horizontal lineout 601 and the 45° diagonal lineout 602 show a gas density profile having a nearly parabolic shape (compare parabolic fit 603) similar to that shown by horizontal lineout 301 for four identical equal gas flows, and so is very suitable for the formation of a guiding channel for a Gaussian laser pulse, e.g., one having a radius $w_0$=25 μm as shown in the FIGURE.

In addition, combining the offset colliding gas flows with a longitudinal motion of the gas as described above can further provide stability and tunability to the gas channel. See K. Duraisamy and S. K. Lele, "Evolution of isolated turbulent trailing vortices," *Phys. Fluids* 20, 035102 (2008).

Thus, the present invention provides a technique for producing a guiding channel for a laser pulse. No other currently known technique can produce a guiding channel from neutral gas as is produced by the method of the present invention. The technique of the present invention does not require any additional optical components and the length of the guiding structure is limited only by the length of the gas column. The device can be used at high repetition rates that depend only on the vacuum pumping efficiency. The wall-free technique allows use of standard diagnostic technique such as optical interferometry, and is compatible with electron injection schemes with transversely incident laser pulses. See M. Chen, E. Esarey. C. G. R. Geddes, E. Cormier-Michel, C. B. Schroeder, S. S. Buianov, C. Benedetti, L. L. Yu, S. Rykovanov, D. L. Bruhwiler, and W. P. Leemans, "Electron injection and emittance control by transverse colliding pulses in a laser-plasma accelerator," *Phys. Rev. STAB* 17, 051303 (2014); and R. Lehe, A. F. Lifschitz, X. Davoine, C. Thaury, and V. Malka, "Optical Transverse Injection in Laser-Plasma Acceleration," *Phys. Rev. Lett.* 111, 085005 (2013).

In contrast to capillary based plasma channels, the colliding jets scheme is compatible with standard transverse plasma diagnostics and cannot be damaged by a laser pulse. Enclosure of the gas jets assembly into a transparent container with pinholes for the main laser beam can reduce requirements to a differential vacuum pumping and increase the repetition rate.

Figure 7A:
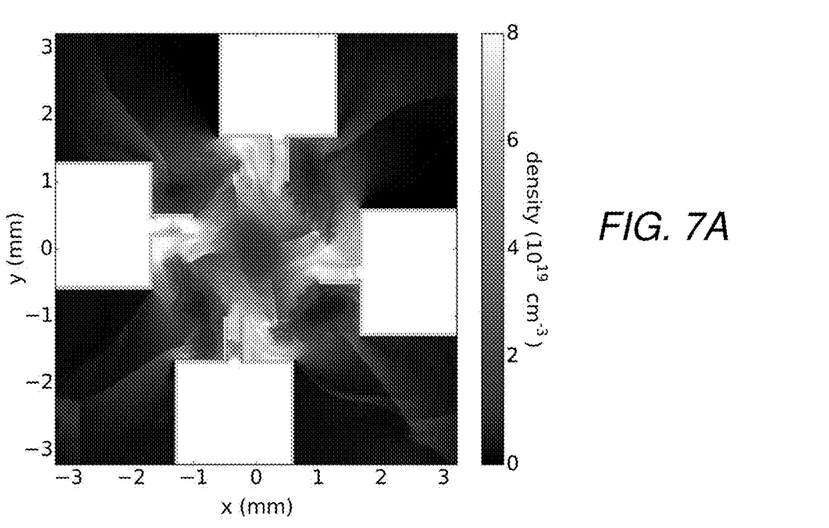
FIGS. 7A and 7B are plots illustrating the manner in which the gas density profile scales with the gas pressure in a method for forming a wall-free plasma waveguide by means of colliding gas jets in accordance with the present invention.
Figure 7B:
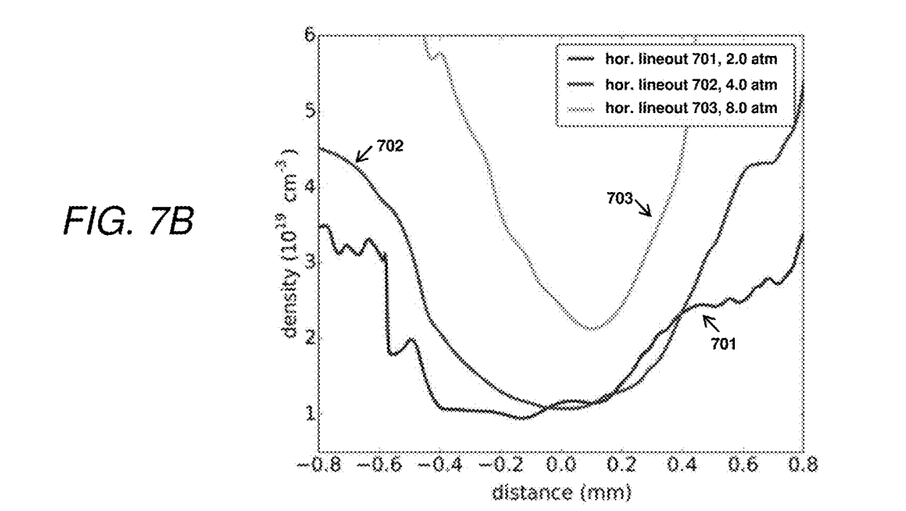

In addition, the colliding jets plasma guiding structure formed in accordance with the present invention is scalable and tunable to a wide range of plasma parameters. An exemplary case of this is illustrated by the plots in FIG. 7B, which provide lineouts for the offset gas jets shown in FIG. 7A (same as in FIG. 6B) at different gas pressures, and shows that in the case of offset gas jets, higher gas pressures produce more stable, parabolic gas density profiles. Thus, as shown in FIG. 7B, gas jets having a backing pressure of 2.0 atm inside the gas jet reservoirs (lineout 701) produce an ill-defined density profile, where the density varies considerably over the horizontal distance from the center and has no readily defined minimum. Gas jets having a backing pressure of 4.0 atm (lineout 702) produce an improved gas density profile having a roughly parabolic shape, while the gas jets having a backing pressure of 8.0 atm (lineout 703) produce an almost fully parabolic density profile, suitable, as described above, for creation of a channel to guide a Gaussian laser pulse.

Thus, in accordance with this aspect of the present invention, simply by changing the gas pressure, we can change depth of the plasma channel and, as a result, change the matching radius of the laser beam, which allows us to focus the laser beam in different ways while still being able to guide it through the channel.

In other embodiments, the plasma guiding channel can be configured to guide a laser beam having a specified spot size by adjusting the nozzle separation distances, which changes the diameter of the channel. Other parameters which can be varied to obtain a channel configured to guide a desired laser beam include the offset, the tilt, and/or the shape of the gas nozzles.

As described above, gas ionization to form the plasma guiding channel can be performed by standard techniques like laser or electrical discharge. For example, for a shorter channel, a picosecond or nanosecond laser pulse focused at the entrance or along the gas channel can ionize the gas as shown in FIG. 1, while a longer channel can be formed using an electrical discharge to ionize the gas in and around the center and create the required plasma density distribution.

Since the gas density is already minimal at the center and no gas needs to be moved for the plasma channel generation, in still other embodiments, bulk ionization of the entire gas volume is acceptable. This can be done by more exotic methods like high pressure RF discharge. See Claire Tendero, Christelle Tixier, Pascal Tristant, Jean Desmaison, and Philippe Leprince, "Atmospheric pressure plasmas: A review," *Spectrochimica Acta Part B,* 61, 2 (2006). As an advantage over laser ionization, these techniques can be engineered to ionize gas over longer distances.

In still other embodiments, the gas jets can be replaced by high density plasma torches. See Andreas Schutze, James Y. Jeong, Steven E. Babayan, Jaeyoung Park, Gary S. Selwyn, and Robert F. Hicks, "The Atmospheric-Pressure Plasma Jet: A Review and Comparison to Other Plasma Sources," *IEEE Trans. Plasma Sci.,* 26, 1685(1998). In such cases, the ionized channel can be created by colliding plasma jets or plasma vortices.

Alternatives

There are alternative techniques for the formation of a laser guiding structure.

One alternative to the colliding jets technique of the present invention utilizes the hydrodynamic radial expansion of the plasma heated by high energy laser pulse. In such a technique, however, in order to produce axially extended guiding channel, the "hydrodynamic heater" pulses must be line-focused into the gas column, either by an axicon (conical lens) or by cylindrical focusing optics, see C. G. R. Geddes et al., "High-quality electron beams from a laser wakefield accelerator using plasma-channel guiding," *Nature* 431, 538 (2004), which introduces significant complexity into the optical alignment of the lasers. In such cases, the heater beam size and the clear aperture of the line-focusing element further impose limits to the maximum channel length.

In another alternative to the method of the present invention, a pre-formed guiding device is a discharge-based dielectric capillary. However, in this case, the dielectric wall is subject to damages by the laser field, discharge current, and plasma. In addition, standard diagnostic techniques such as optical interferometry are no longer valid for transversely probing the plasma density profile in the capillary, making it more difficult to monitor the performance of the waveguide.

However, none of these alternative techniques can produce a predetermined density profile from neutral gas as can method of the present invention.

Thus, the present invention provides an apparatus and method for creating a free-space plasma channel for guidance of high-intensity laser beams. The gas outflow of gas jets symmetrically arranged around a central axis collides at their center and forms a vortex structure comprising a gas channel having a parabolic density profile in which an on-axis gas density depression is surrounded by higher density walls. The gas channel can be ionized, either by a laser pulse or by an electrical discharge, to create a plasma channel that can guide an ultrashort laser pulses for laser-based particle acceleration and related applications. A detailed 2-D fluid dynamics simulation of this free-space guiding channel indicates generation of a stable guiding profile lasting tens of microseconds. Analysis has shown showed that a 1% tolerance in the backing pressures and/or a few microseconds in time jitter are acceptable for the practical application of the device.

Although particular embodiments, aspects, and features have been described and illustrated, it should be noted that the invention described herein is not limited to only those embodiments, aspects, and features, and it will be readily appreciated by those skilled in the art that modifications to such embodiments, aspects, and features may be made. The present application contemplates any and all modifications within the spirit and scope of the underlying invention described and claimed herein, and all such modifications and embodiments are within the scope and spirit of the present disclosure.

What is claimed is:

1. A method for forming a laser guiding structure, comprising:

activating a plurality of gas flows from a corresponding plurality of gas nozzles arranged at equal angular intervals around a central axis, the gas nozzles being configured to produce a plurality of gas flows that intersect with one another along the central axis to controllably form a gas channel from the neutral gas, the gas channel having gas density depression at a center of the gas channel; and at time t1, firing an ionizing pulse through the gas channel at the gas density depression to ionize the gas channel; wherein at least one of a geometric configuration of the gas nozzles and a backing pressure of the gas flows is configured to cause the gas channel to have a predetermined gas density profile such that the ionized gas channel forms a plasma channel having a predetermined spatial profile, the plasma channel forming a laser guiding structure configured to guide a laser pulse having predetermined spatial parameters fired into the gas along the central axis at time t2.

2. The method according to claim 1, wherein the ionizing pulse is a laser pulse fired through the gas density depression at time t1.

3. The method according to claim 1, wherein the ionizing pulse is an electrical discharge fired through the gas density depression at time t1.

4. The method according to claim 1, wherein the gas flows from all of the gas nozzles are at the same pressure.

5. The method according to claim 1, wherein a gas flow from a first one of the gas nozzles is at a first pressure and a gas flow from a second one of the gas nozzles is at a second pressure, the first pressure being different from the second pressure.

6. The method according to claim 1, wherein the gas flows from all of the gas nozzles are activated simultaneously.

7. The method according to claim 1, wherein a gas flow from a first one of the gas nozzles is activated at a first time and a gas flow from a second one of the gas nozzles is activated at a second time, the first time being different from the second time, the method further comprising creating a longitudinal gas flow through the gas channel to cause the gas to experience a spiraling motion and create a horizontally and vertically stable gas density depression in the gas channel.

8. The method according to claim 7, wherein the longitudinal gas flow is created by pumping the intersecting gases through the gas channel.

9. The method according to claim 7, wherein the longitudinal gas flow is created by aiming the gas jets towards a direction of the longitudinal gas flow.

10. The method according to claim 1, wherein the gas nozzles are arranged so that the gas flows intersect head-on to produce a gas channel having a predetermined flat-top gas density profile.

11. The method according to claim 1, wherein the gas nozzles are arranged so that the intersecting gas flows do not intersect directly head-on but are offset from one another to produce a gas channel having a predetermined parabolic gas density profile.

12. The method according to claim 11, the method further comprising creating a longitudinal gas flow through the gas channel.

13. The method according to claim 11, wherein the longitudinal gas flow is created by pumping the intersecting gases through the gas channel.

14. The method according to claim 11, wherein the longitudinal gas flow is created by aiming the gas jets towards a direction of the longitudinal gas flow.

15. The method according to claim 1, wherein a spatial profile of the plasma channel laser guiding structure is further tuned by tuning at least one parameter of the ionizing pulse fired through the gas channel.

16. The method according to claim 15, wherein the spatial profile of the plasma channel laser guiding structure is tuned by tuning a timing of the ionizing pulse fired through the gas channel.

* * * * *